United States Patent [19]
Askins

[11] Patent Number: 5,329,825
[45] Date of Patent: Jul. 19, 1994

[54] PRECISION MOVING STAGE

[75] Inventor: Paul D. Askins, Rochester, N.Y.

[73] Assignee: Eastman Kodak Company, Rochester, N.Y.

[21] Appl. No.: 981,716

[22] Filed: Nov. 25, 1992

[51] Int. Cl.$^5$ .............................................. F16H 25/24
[52] U.S. Cl. ................. 74/89.15; 74/424.8 R; 108/20; 108/143; 384/38
[58] Field of Search ............... 74/89.15, 424.8 R; 108/20, 143; 384/29, 37, 38

[56] References Cited

U.S. PATENT DOCUMENTS

| | | | |
|---|---|---|---|
| 3,638,933 | 2/1972 | Burnette et al. | 269/60 |
| 3,745,840 | 7/1973 | Guralnick | 74/89.15 |
| 4,264,112 | 4/1981 | Magnuson | 384/29 |
| 4,370,054 | 1/1983 | Isohata et al. | 355/53 |
| 4,372,222 | 2/1983 | Tice | 108/137 |
| 4,372,223 | 2/1983 | Iwatani | 108/143 |
| 4,495,871 | 1/1985 | Nagata et al. | 108/20 |
| 4,597,303 | 7/1986 | Nakaya | 74/89.15 |
| 4,628,756 | 12/1986 | Kimura et al. | 108/143 X |
| 4,637,738 | 1/1987 | Barkley | 384/38 |
| 4,714,354 | 12/1987 | Satomi | 384/38 |
| 5,143,454 | 9/1992 | Morita | 384/37 |

OTHER PUBLICATIONS

John Strong, Ph.D., *Procedures in Experimental Physics*, Copyright 1938, pp. 585–589.

Primary Examiner—Allan D. Herrmann
Attorney, Agent, or Firm—Peter J. Bilinski

[57] ABSTRACT

A precision positioning stage assembly, comprising a movable stage, a drive screw having it axis parallel to the direction of movement of the stage, a follower threadably engaged with the drive screw, and a linear guide rail for supporting one side of the stage. The linear guide rail has its axis parallel to the direction of movement of the stage. A drive member is secured to the stage which has a pair of oppositely disposed contact surfaces spaced apart a predetermined distance. A torque member is secured to the follower, the torque member having a drive section for placement between the contact surfaces and moving the stage along the guide rail. The drive section and the contact surfaces have a configuration so as to provide substantially point contact therebetween.

15 Claims, 8 Drawing Sheets

PRECISION MOVING STAGE

FIELD OF THE INVENTION

This invention relates to a precision moving stage which is employed to move an article along a linear path at a precise constant speed.

BACKGROUND OF THE INVENTION

It has been found that a stimulable phosphor may be used in radiation image recording and reproducing system. Specifically, a sheet provided with a layer of stimulable phosphorus (herein referred to as stimulable phosphorus sheet) when first exposed to radiation passing through an object, such as a human body, will provide a radiation image stored thereon. When this image has been exposed to a stimulating ray beam such as a laser beam, this will cause the stimulable phosphorus sheet to emit a light in proportion to stored radiation energy. The light emitted by the stimulable phosphorus sheet, upon stimulation thereof, is photoelectrically detected and converted to an electric image signal, and the radiation image of the object is reproduced by a visible image by use of image signal on a recording medium such as a photographic film. The stimulating of the stimulable sheet by a laser beam is typically done using a raster scanning technique. The slow scan direction transport of the stimulable phosphorus sheet is important to the quality of the generated image. Slow scan velocity must be regulated such that the exposure modulation of the scanning beam does not cause image signal modulation greater than a threshold of visible contrast modulation. Therefore, it is important to provide a well regulated linear motion.

Lead screw mechanisms are commonly used to convert angular velocity to linear motion. Such mechanisms usually employ at least one linear guide rod. Lead screw mechanisms commonly require extreme precision and manufacture and assembly in order to function without sticking, jamming, or causing vibrations in required input torque. Any one of these events may cause observable velocity changes when the lead screw mechanism is used for storage phosphorus raster scanning. In addition, linear guides that are used with the lead screw must be exactly parallel to the lead screw and to each other in order to prevent jamming. Similarly, the bearings attached to the moving stage, which supports the stimulable phosphorus sheet, must be colinear (at all points) to the guides on which they operate to prevent jamming. For long linear motion, such mechanisms may be beyond the capability of normal manufacturing methods to build, thus requiring time-consuming and expensive adjustments during assembly.

Additionally, the mechanism used to guide the stage can not be too loose, or outside forces such as externally applied shocks, dust on the linear guides, etc., can ruin an image being formed by the raster scanning mechanism. The mechanism guiding the linear motion must be sufficiently rigid so that expected forces do not deflect the moving stage such that artifacts will show in the scanned image.

Applicant has invented an improved precision stage assembly which reduces the required precision and expense of manufacturing while maintaining smooth, rigidly guided linear motion to a stage. The present invention comprises improved mechanisms for coupling the lead screw and the stage, and for coupling the stage and the guide bearings on the linear guide which minimizes jamming and sticking, while preventing deflection of the stage from its path by normal forces experienced during operation, such as shocks and contamination of the guide rails.

SUMMARY OF THE INVENTION

In one aspect of the present invention there is provided a precision positioning stage assembly, comprising.

a movable stage;

a lead screw having a longitudinal axis parallel to the direction of movement of said stage;

a follower threadably engaged with the lead screw for converting rotational motion of the lead screw to linear motion;

a linear guide rod for supporting one side the stage, the linear guide rod having its axis parallel to the direction of movement of the stage;

means for transferring linear motion of the follower to the stage;

means for compensating for misalignment between the lead screw and the linear guide rod upon which the stage is slideably mounted; and means for compensating for misalignment between the stage and the linear guide rod upon which it is slideably mounted.

In another aspect of the present invention there is provided a precision positioning stage assembly, comprising:

a movable stage;

a lead screw having a longitudinal axis parallel to the direction of movement of the stage;

a follower threadably engaged with the lead screw for converting rotational motion of the lead screw to linear motion;

a linear guide rod for supporting one side the stage, the linear guide rod having its axis parallel to the direction of movement of the stage;

means for transferring linear motion of the follower to the stage, the means transferring the linear motion through point contact surfaces provided therebetween.

DESCRIPTION OF THE DRAWINGS

In the Detailed Description of the Preferred Embodiment of the invention presented below, reference is made to the accompanied drawing, in which.

DETAILED DESCRIPTION

Figure 1:
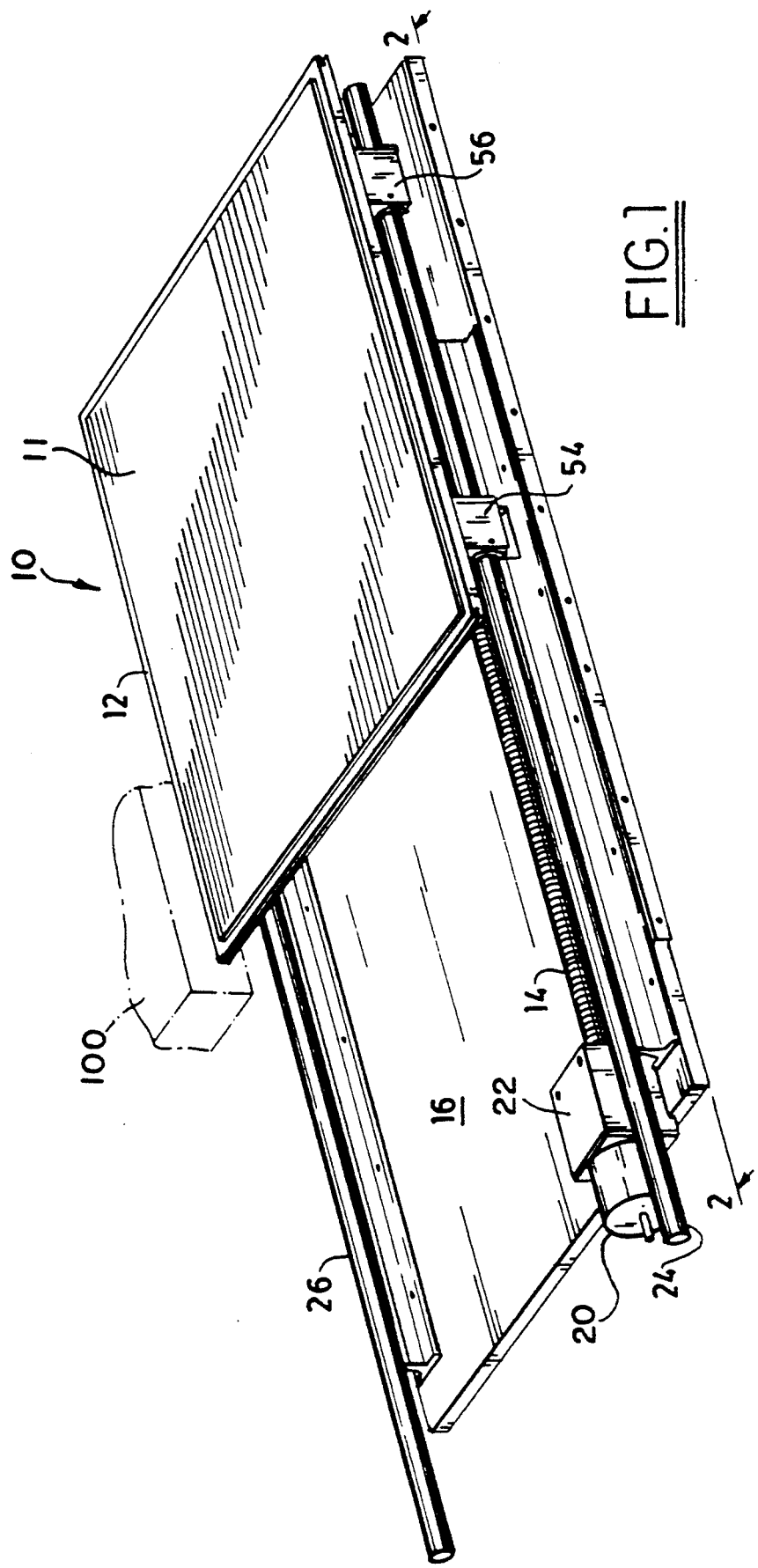
FIG. 1 is a perspective view of a precision stage assembly made in accordance with the present invention.

Referring to the drawings, there is illustrated a precision stage assembly 10 made in accordance with the present invention. The precision stage assembly 10 is designed to be incorporated into a reader for reading of a stored image on a stimulable phosphorus sheet 11, FIG. 1 that has been exposed to radiation. In particular, the precision stage assembly 10 is designed for use in a raster scanning reader shown in phantom in FIG. 1 as 100. The precision stage assembly 10 includes a moveable stage 12 which includes a drive screw 14 which is mounted to base 16. The drive screw 14 is in threaded engagement with a drive nut 18. Movement of the drive nut 18 is caused by relative rotation of the drive screw 14. A motor 20 and corresponding transmission 22 is provided for rotating drive screw 14 in the appropriate direction. This stage 12 is supported by a pair of guide rails 24,26 which are axially spaced apart and secured to base 16. The guide rails 24,26 and drive screw 14 are in substantial parallel alignment with each other.

With respect to coupling of the drive nut 18 to the stage 12 so as to transmit linear motion by rotation of the drive screw 14, it is desirable to couple only that component of the drive screw motion which is parallel to the local axis of the linear guide rails 24,26. This allows the drive screw 14 to be installed with loose tolerances with respect to the linear guides rails 24,26. This also allows the linear guides rails 24, 26 and drive screw 14 to be only reasonably straight, and thus allow for small variation from parallelism. Referring to FIGS. 2-9, there is illustrated in greater detail the manner in which linear motion is transmitted to the stage 12. As can be seen in the preferred embodiment illustrated, the drive screw 14 is rigidly attached to base 16 allowing it only free to rotate about its longitudinal axis. A torque member 28 is secured to drive nut 18 and is used for transferring the rotational movement of the drive screw 14 to the linear motion of the stage 12. The torque member 28 also provides means for resisting rotation of the drive nut 18 about the drive screw 14. In the particular embodiment illustrated, torque member 28 comprises a generally flat plate member having a mounting section 30, a drive section 32 immediately above the mounting section 30, and a stop section 34 which extends from the drive section 32 outward between the stage 12 and adjacent guide rail 24. In the particular embodiment illustrated, stop section 34 has a generally rectangular configuration. The mounting section 30 is provided with a central opening 36 through which the drive screw passes and a plurality of openings 38 through which screws 39 pass to clampingly secure the torque member 28 to drive nut 18 by engaging threaded openings provided in drive nut 18. It is, of course, understood that the torque member 28 may be secured to drive nut 18 in any desired manner. Stop section 34 is provided with a narrow slot/opening 42 which divides stop sections to an upper section 43 and lower section 44. The slot 42 in the particular embodiment illustrated has a width W of about 06 inches (1.74 cms). The stop section 34 extends adjacent guide rod 24 such that the lower surface 45 of lower section 44 engages the top of guide rail 24. The upper section 43 has a small outwardly extending projection 46 which extends above the top surface of the adjacent upper section 43. Projection 46 preferably extends a distance D of approximately 0.06 inches (1.72 cms) thereabove. The torque member 28 is made of a material such that projection 46 is in engagement with the bottom surface 47 of moveable stage 12 while at the same time the bottom edge 45 engages the top of guide rail 24. The bottom edge 45 of lower section 44 stops the drive nut 18 from spinning about the drive screw 14. This causes the drive nut 18 to travel forward along the lead screw 14. The upper section 43 contacts the bottom surface 47 of the stage 12 and serves the same purpose for reverse rotation of the drive screw 14. The stop section 34 also is slightly spring loaded against the bottom surface 47 of the stage 12 to prevent/minimize the transmission of vibration as the stage moves between its two stop positions. The bottom edge 45 of the lower section 44 is also free to slide transversely (as illustrated by arrow 49) with respect to the adjacent guide rail 24. This allows transverse misalignment between the drive screw 14 and the adjacent guide rail 24 to be accommodated without sticking or jamming. Also any transverse component from rotation of a warped lead screw 14 is accounted for without changing the required input torque. Additionally, any vertical misalignment between the drive screw 14 and guide rod 26 is accommodated by the vertical clearance between the torque member 28 and stage 12 which allows gradual rotation of a torque member 28 and drive nut 18 about the guide surface. Further, vertical components resulting from warped drive screw rotation are permitted without variation of the required input torque.

Figure 7:
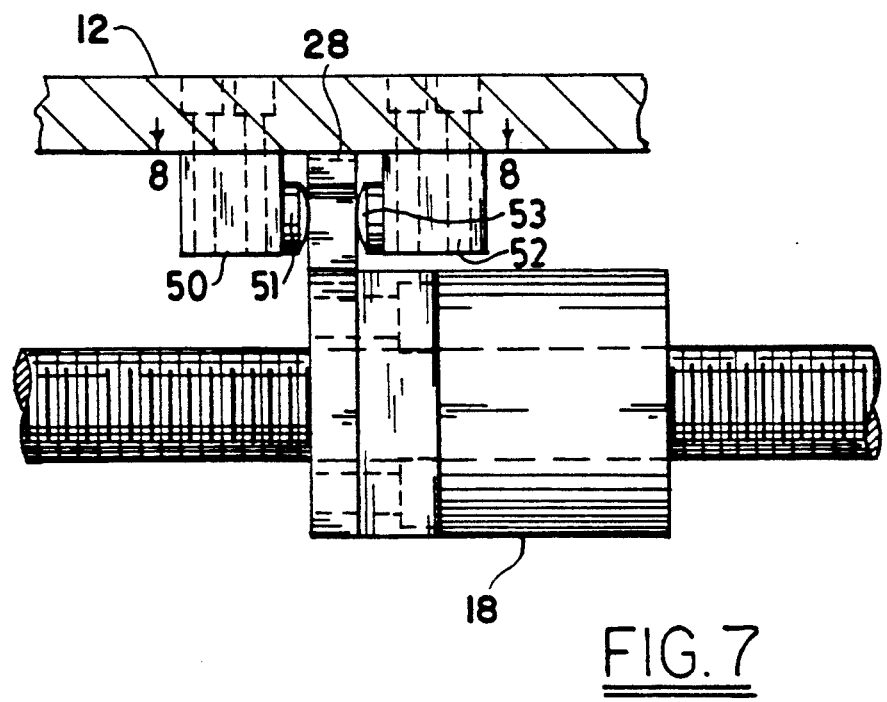
FIG. 7 is a side elevational view of FIG. 6 as taken along line 7—7.
Figure 8:
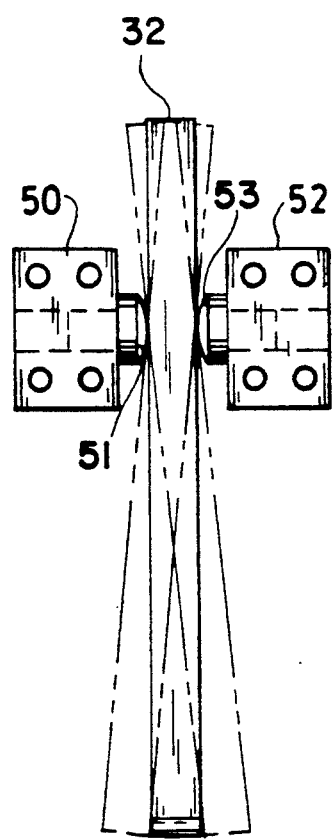
FIG. 8 is a top plan view of FIG. 7 as taken along line 8—8.

Referring to FIGS. 7 and 8, there is illustrated means for transferring the linear movement of the drive nut 18 to the stage 12. In particular, the stage 12 is provided with a pair of drive members 50,52 which are secured to the bottom of moveable stage 12. The drive members 50,52 are positioned on both sides of the torque member 28 so as to capture the drive section 32 therebetween. The spacing between the two drive members 50,52 is such that the torque member 28 fits snugly therebetween. Each of the drive members 50,52 have a contact surface 51,53, respectively, which engages the sides of torque member 28. Each of the contact surfaces 51,53 are configured so as to provide point contact with the torque member 28. In the preferred embodiment illustrated, the contact surfaces 51,53 each have a generally semi-spherical cross-sectional configuration and the sides of the torque member 28 are substantially planar. Referring to FIG. 8, there is illustrated by solid lines the initial position of the torque member 28 between the drive members 50,52. The coupling between drive members 50,52 and torque member 28 is designed such that only the component of a drive screw 14 which travels parallel to the local axis of the linear guide is being transferred. As torque member 28 moves either vertically, or horizontally, with respect to the adjacent linear guide rails 24,26 and stage 12, the torque member 28 is free to slide between the contact surfaces 51,53 as illustrated by the phantom lines in FIG. 8. This allows a transverse motion between the components. This construction also minimizes jamming, or variation in the required input torque due to the wobble of the drive nut 18 and torque member 28 caused by rotation of a warped drive screw 14.

Figure 2:
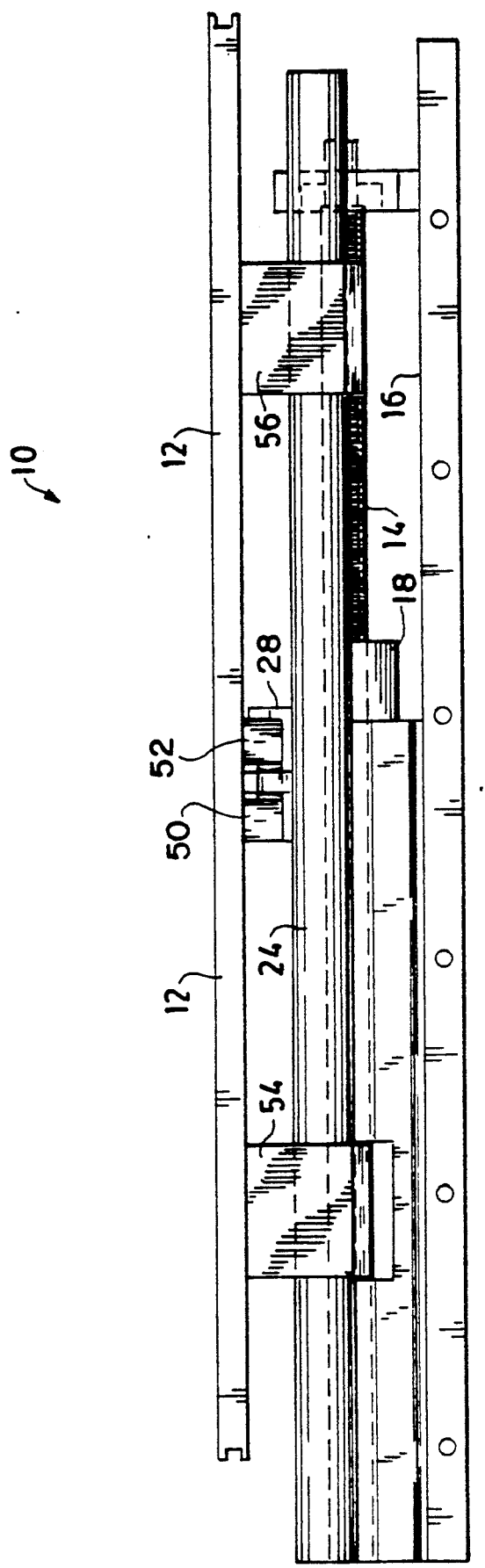
FIG. 2 is a side elevational view of the precision stage assembly of FIG. 1 as taken along line 2—2.
Figure 3:
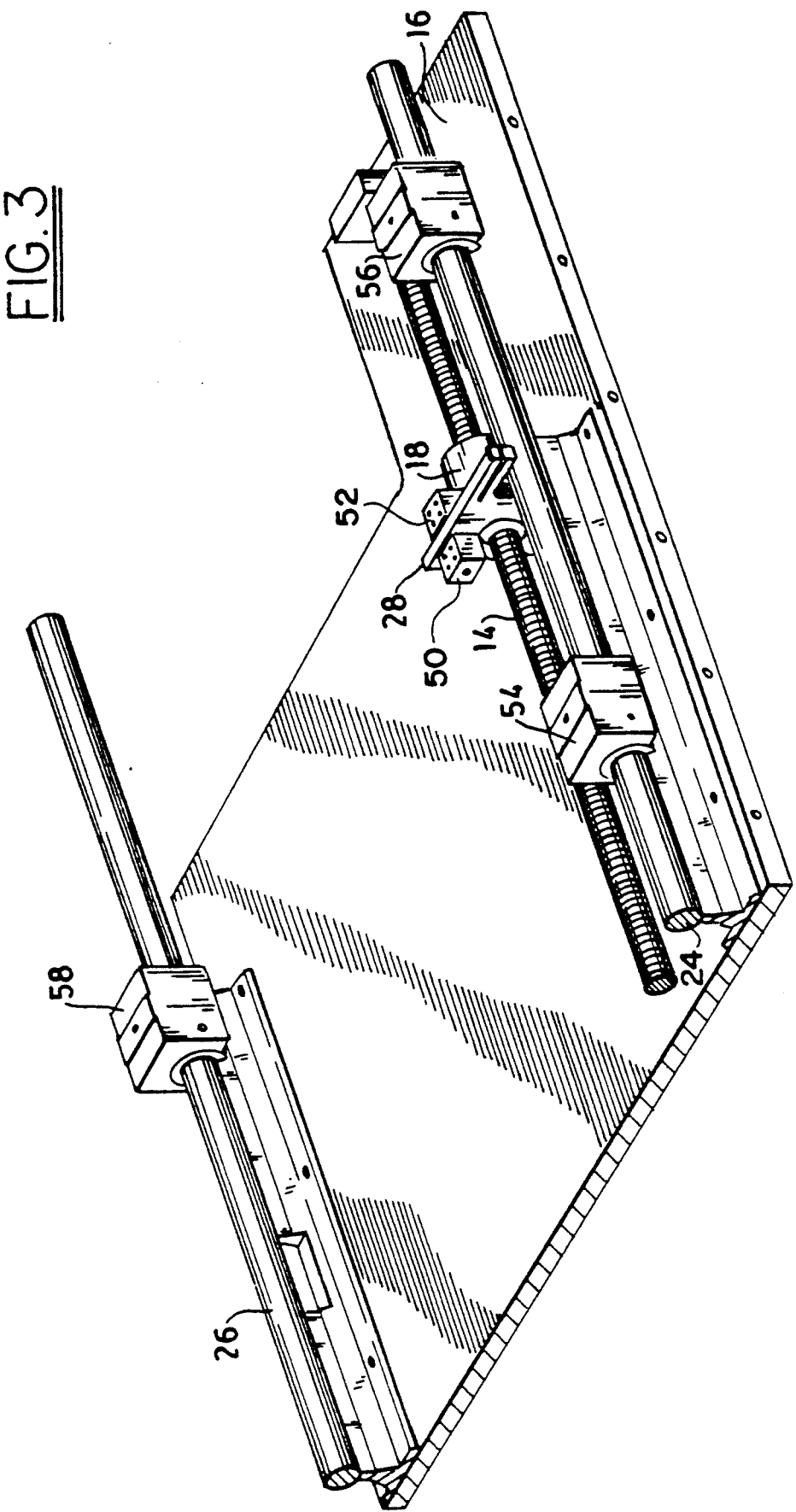
FIG. 3 is a partial perspective view of the precision stage assembly of FIG. 1 with the stage removed.
Figure 4:
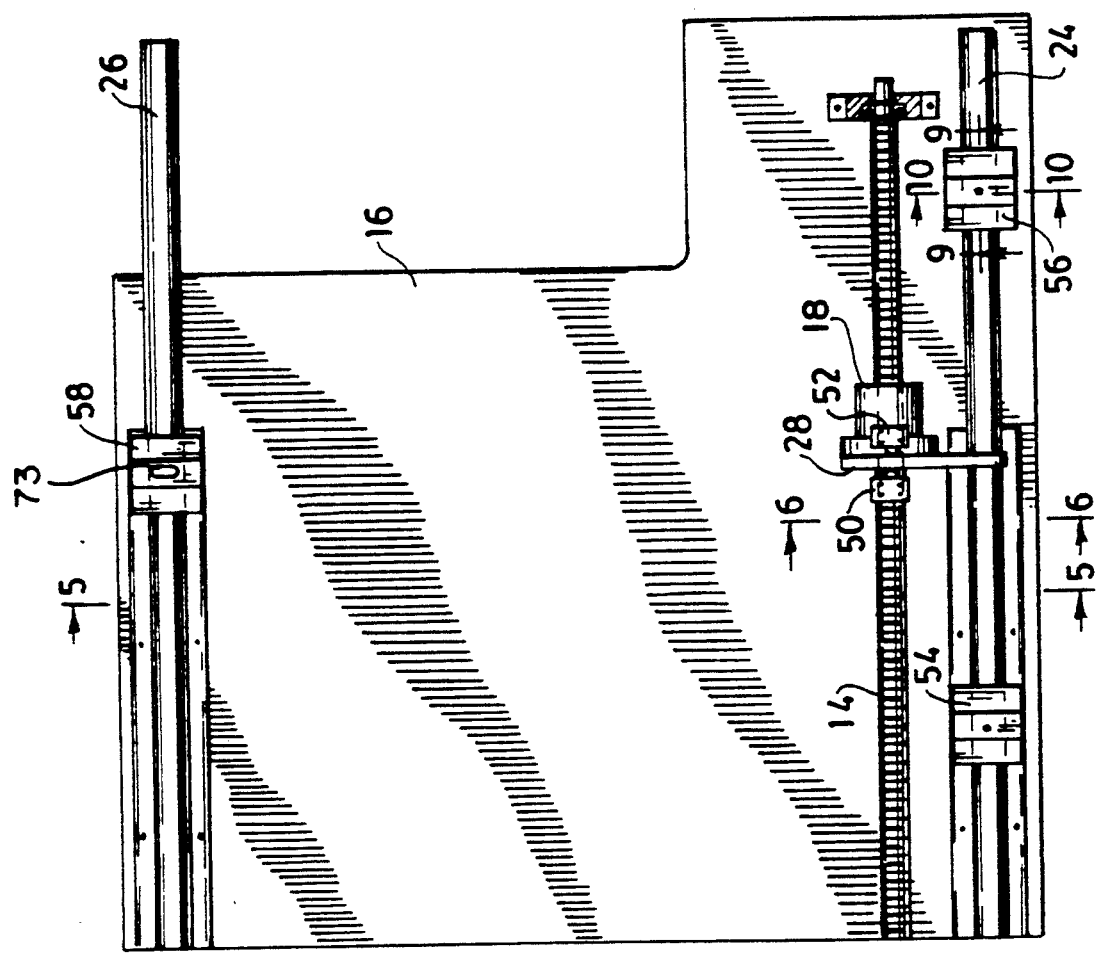
FIG. 4 is a top plan view of the precision stage assembly of FIG. 3.
Figure 5:
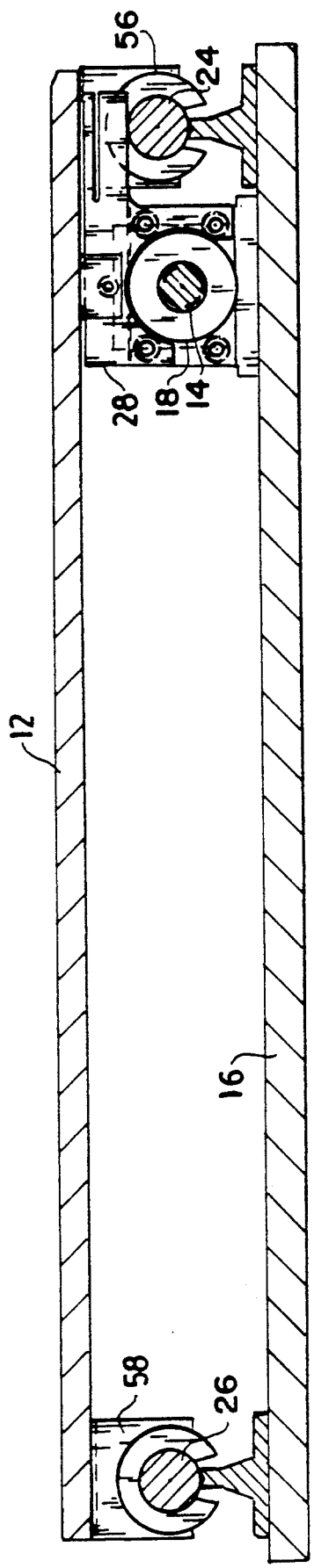
FIG. 5 is a cross-sectional view taken along line 5—5 of FIG. 4 with the addition of the stage.
Figure 6:
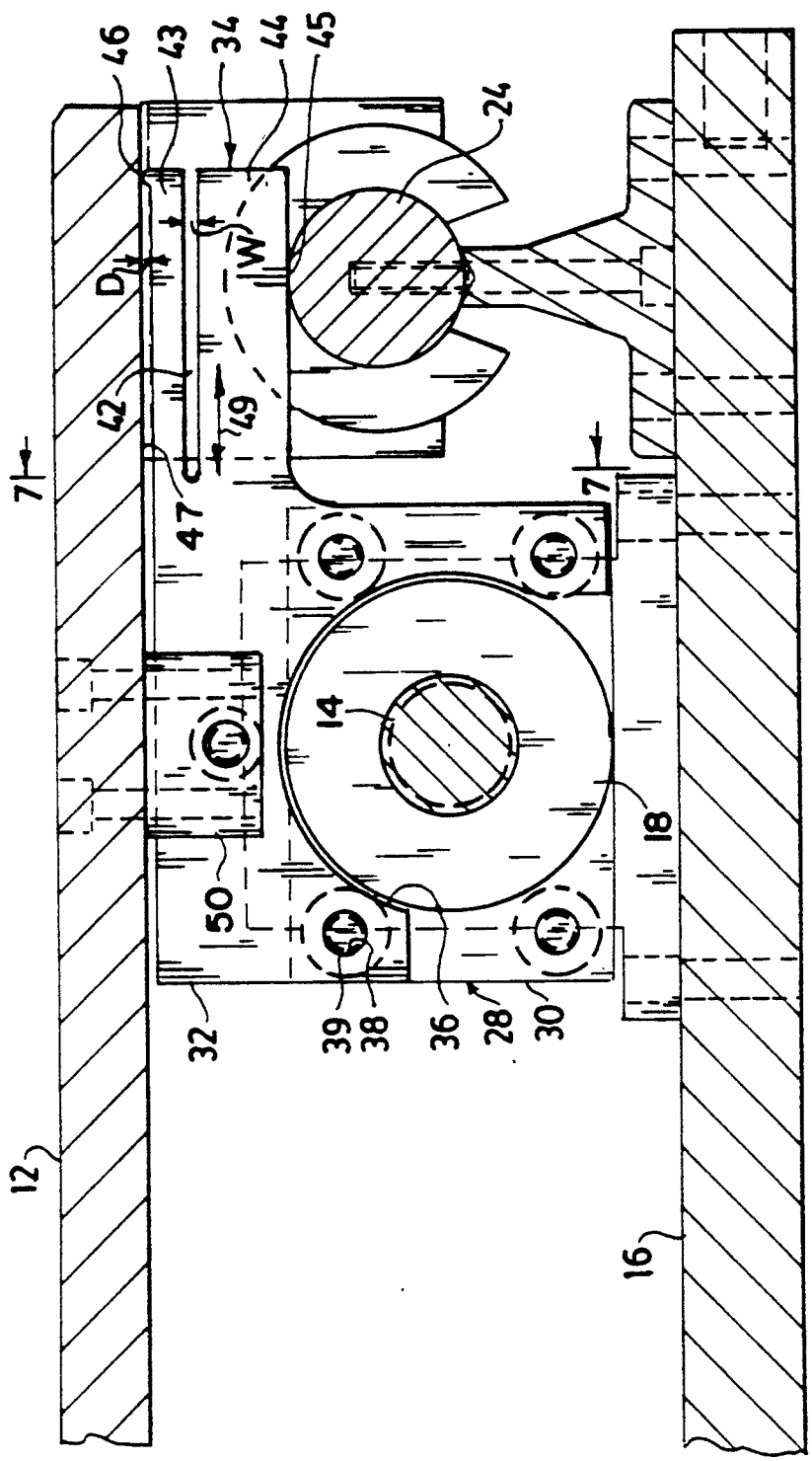
FIG. 6 is an enlarged cross-sectional view taken along line 6—6 of FIG. 4 with the addition of the stage.

Means are also provided for compensating for misalignment between the stage 12 and the linear guide rails 24,26 upon which the stage 12 is slideably mounted. Referring to FIGS. 1-3, the stage 12 is slideably mounted to guide rail 24 by a front bearing assembly 54 and rear bearing assembly 56.

The stage 12 is also slideably mounted to linear guide rod 26 by a third bearing assembly 58. Bearing assemblies 54,58 are identical in construction. Therefore, this application will be limited to discussion of single bearing assembly 54, it being understood that the bearing assembly 58 is identically constructed. Bearing assembly 56 is substantially the same as bearing assembly 54, except with minor differences which will be discussed later therein.

Figure 10:
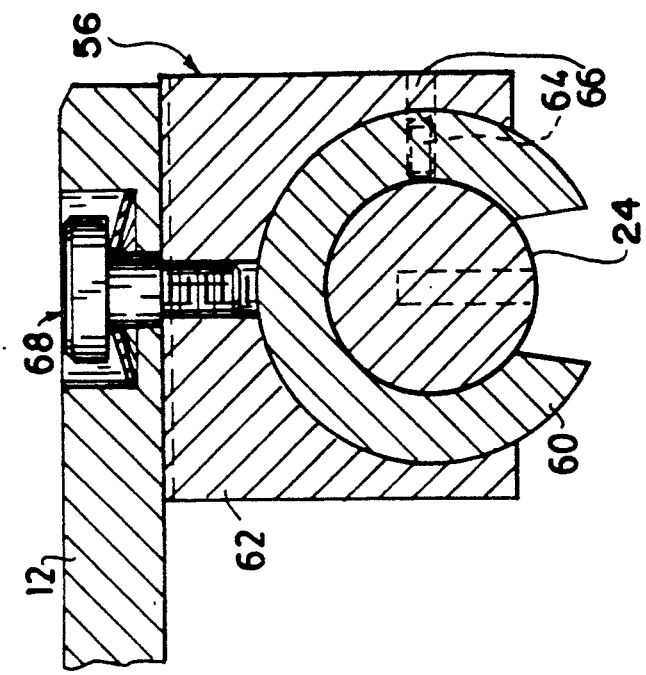
FIG. 10 is an enlarged cross-sectional view taken along line 10—10 of FIG. 4 including a portion of the stage.
Figure 9:
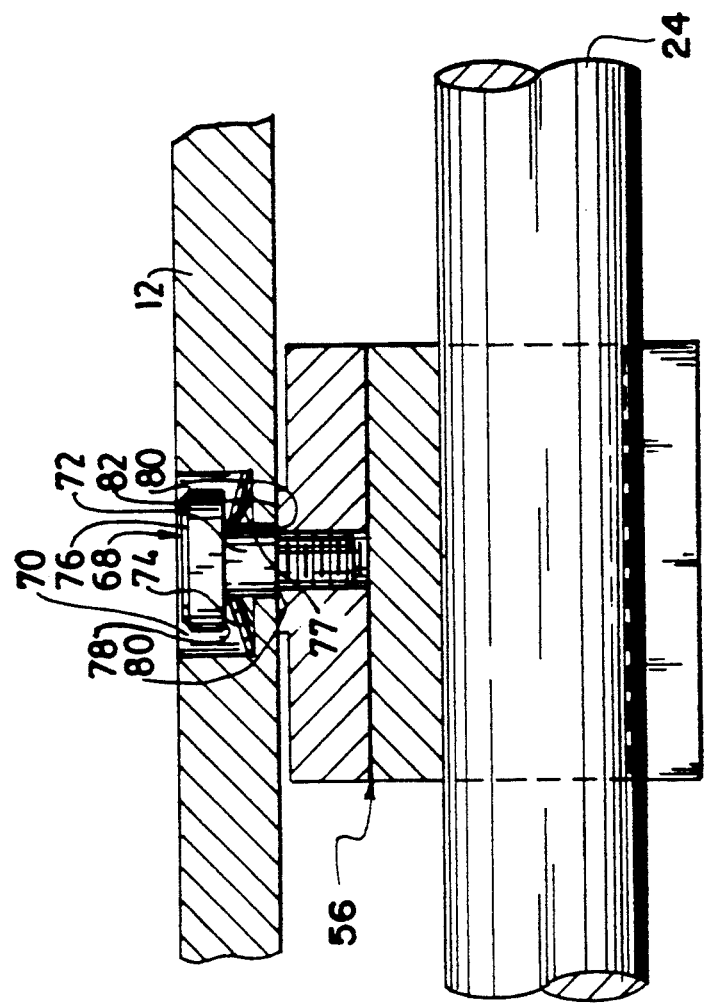
FIG. 9 is a greatly enlarged cross-sectional view taken along line 9—9 of FIG. 4 including a portion of the stage.

Referring to FIGS. 9 and 10, bearing assembly 56 includes a collar 60 which is slideably mounted to guide rail 24, a mounting section 62 secured to collar 60 by a set screw 64 which engage threaded opening 66 in collar 60. The bearing assembly 56 is secured to the stage 12 by a shoulder screw 68. The stage 12 is provided with a recess 70 having a opening 72 which extends through the stage 12. The opening 72 is such that a bearing surface 74 is provided. The screw 68 has a head 76 which is larger than the opening 72, but less in size than the recess 70 such that the top of the head does not extend above the top of the adjacent stage 12. An annular spring 77 is provided between the bearing surface 74 and bottom surface 78 of the head of screw 68. The bottom surface of the shoulder 80 of shoulder screw 68 passes through opening 72 and engages a slightly raised projection having a planar surface 82. As can be seen, the vertical position of the stage 12 is assured by spring 77 positioned between the head 76 of screw 68 and the bearing surface 74.

The mounting of bearing assembly 58 to guide rail 26 is similar to 24 except that in place of opening 72, there is provided an elongated slot 73 which accounts for any change in distance between the two guide rails 24,26. The mounting of the stage 12 in the manner disclosed by the present invention allows the guide rails 24,26 to be mounted using normal manufacturing tolerances.

The present invention provides a relatively inexpensive slow scan motion for a storage phosphorus raster scanner which can be made utilizing inexpensive parts, manufacturing and assembly techniques. Additionally, a mechanism made in accordance with the present invention provides reliability due to its ability to account for misalignment that may occur during use. The rotary motion of the drive screw is converted to a linear motion without sticking, jamming, or variation in required input torque. Further, the present invention provides a rigid mechanism that minimizes disturbance in the motion of the stage due to outside forces such as shocks, or contamination of the guide rails.

It is to be understood that various modifications and changes may be made without departing from the scope of the present invention. The present invention being limited by the following claims.

What is claimed is:

1. In a precision positioning stage assembly, comprising:
 a movable stage;
 a lead screw having a longitudinal axis parallel to the direction of movement of said stage;
 a follower threadably engaged with said lead screw;
 a linear guide rod for supporting one side of said stage, said linear guide rod having its axis parallel to the direction of movement of said stage;
 a drive member secured to said stage, said drive member having a pair of oppositely disposed contact surfaces spaced apart a predetermined distance; and
 a torque member secured to said follower, said torque member having a drive section for placement between said contact surfaces and moving said stage along said guide rod, said drive section and said contact surfaces having an configuration so as to provide substantially point contact therebetween and a stop section for contacting said linear guide rail and said stage for preventing rotation of said follower when said lead screw is rotated.

2. In a precision positioning stage assembly according to claim 1 wherein said contact surfaces have a semispherical configuration and said drive section is substantially planar in cross section.

3. In a precision positioning stage assembly according to claim 1 wherein stage is slideably secured to said linear guide rail by at least one slide bearing assembly.

4. In a precision positioning stage assembly according to claim 3 wherein said at least one slide bearing assembly comprises a shell structure slideably mounted to said guide rail, a mounting section secured to said shell structure for attachment to said stage, a mounting screw for securing said mounting section to said stage and spring means between said mounting screw and stage.

5. In a precision positioning stage assembly, comprising:
 a base;
 a movable stage;
 a lead screw mounted on said base, said lead screw having it axis parallel to the direction of movement of said stage;
 a follower threadably engaged with said lead screw;
 a linear guide rod mounted to said base for supporting one side of said stage, said linear guide rod having its axis parallel to the direction of movement of said stage, said stage being slideably mounted to said linear guide rod by at least one slide bearing assembly;
 a drive member secured to said stage, said drive member having a pair of oppositely disposed contact surfaces spaced apart a predetermined distance; and
 a torque member secured to said follower, said torque member having a substantially planar drive section for placement between said contact surfaces and driving said stage along said guide rod, said drive section and said contact surfaces having an configuration so as to provide substantially point contact therebetween and a stop section for contacting said linear guide rail and said stage, said stop section preventing rotation of said follower when said lead screw is rotated.

6. In a precision positioning stage assembly, comprising:
 a base;
 a movable stage;
 a drive screw mounted on said base, said drive screw having a longitudinal axis which is parallel to the direction of movement of said stage;
 a follower threadably engaged with said drive screw;
 a pair of spaced linear guide rails mounted to said base for supporting said stage, each of said linear guide rails having its axis parallel to the direction of movement of said stage, said stage being slideably mounted to one of said linear guide rails by at least one slide bearing assembly;

a drive member secured to said stage, said drive member having a pair of oppositely disposed contact surfaces spaced apart a predetermined distance;

a torque member secured to said follower, said torque member having a substantially planar drive section for placement between said contact surfaces and driving said stage along said linear guide rails;

means for compensating for misalignment between said drive screw and said linear guide rails upon which said stage is slideably mounted; and means for compensating for misalignment between said stage and said linear guide rails upon which it is slideably mounted and a stop section for contacting a said linear guide rail and said stage, said stop section preventing rotation of said follower when said lead screw is rotated.

7. In a precision positioning stage assembly according to claim 6 wherein said means for compensating for misalignment between the drive screw and said linear guide rails upon which said stage is slideably mounted comprises said drive section and said contact surfaces having an configuration so as to provide substantially point contact therebetween.

8. In a precision positioning stage assembly according to claim 6 wherein said means for compensating for misalignment between said stage and said guide rod upon which said stage is slideably mounted comprises said at least one bearing assembly comprising a shell section slideably engaging the guide rail and a mounting section having a threaded opening, said stage having an opening and a bearing surface disposed around said opening, a shoulder screw for placement through said opening in said stage and engagement in said threaded opening in said mounting section, and a spring associated with said shoulder screw.

9. In a precision positioning stage assembly according to claim 6 wherein said means for compensating for misalignment between said stage and said linear guide rails upon which said stage is slideably mounted comprises said at least two bearing assemblies each said assembly having a shell section for slideably engaging a said guide rail and a mounting section having a threaded opening, said stage having openings associated with each of said at least two bearing assemblies and a bearing surface disposed around each of said openings, a shoulder screw which is provided for placement through each of said openings in said stage and engagement in said threaded opening in said mounting section of the associated bearing, one of said openings in said stage having a generally elongated shape, and a spring associated with said shoulder screw.

10. In a precision positioning stage assembly, comprising:

a movable stage;

a drive screw having a longitudinal axis which is parallel to the direction of movement of said stage;

a follower threadably engaged with said drive screw;

a linear guide rail for supporting one side of said stage, said linear guide rail having its axis parallel to the direction of movement of said stage;

a drive member secured to said stage, said drive member having a pair of oppositely disposed contact surfaces spaced apart a predetermined distance;

a torque member secured to said follower, said torque member having a drive section designed to fit between said contact surfaces for driving said stage along said linear guide rail; and means for compensating for misalignment between said drive screw and said linear guide rail upon which said stage is slideably mounted and a stop section for contacting said linear guide rail and said stage, said stop section preventing rotation of said follower when said lead screw is rotated.

11. In a precision positioning stage assembly, comprising:

a movable stage;

a drive screw having a longitudinal axis which is parallel to the direction of movement of said stage;

a follower threadably engaged with said drive screw;

a pair of spaced linear guide rails for supporting said stage, each of said linear guide rails having its axis parallel to the direction of movement of said stage;

a drive member secured to said stage, said drive member having a pair of oppositely disposed contact surfaces spaced apart a predetermined distance;

a torque member secured to said follower, said torque member having a drive section designed to fit between said contact surfaces for driving said stage along said guide rail; and means for compensating for misalignment between said stage and said linear guide rail upon which it is slideably mounted and a stop section for contacting a said linear guide rail and said stage, said stop section preventing rotation of said follower when said lead screw is rotated.

12. In a precision positioning stage assembly, comprising:

a movable stage;

a drive screw having a longitudinal axis which is parallel to the direction of movement of said stage;

a follower threadably engaged with said drive screw for converting rotational motion of said drive screw to linear motion;

a linear guide rail for supporting one side of said stage, said linear guide rail having its axis parallel to the direction of movement of said stage;

means for transferring linear motion of said follower to said stage;

means for preventing rotation of said follower when said lead screw is rotated;

means for compensating for misalignment between said drive screw and said linear guide rail upon which said stage is slideably mounted; and means for compensating for misalignment between said stage and said linear guide rail upon which it is slideably mounted.

13. In a precision positioning stage assembly, comprising:

a movable stage;

a lead screw having a longitudinal axis parallel to the direction of movement of said stage;

a follower threadably engaged with said lead screw for converting rotational motion of said lead screw to linear motion;

a linear guide rod for supporting one side said stage, said linear guide rod having its axis parallel to the direction of movement of said stage; and means for preventing rotation of said follower when said lead screw is rotated;

means for transferring linear motion of said follower to said stage, wherein said means transferring said linear motion comprises point contact surfaces provided therebetween.

14. A reader for reading a latent image on a stimulable phosphor member, said reader having precision positioning stage assembly for moving said stimulable phosphor member through a scanning station, said precision positioning assembly comprising:

a movable stage;

a lead screw having it axis parallel to the direction of movement of said stage;

a follower threadably engaged with said lead screw for converting rotational motion of said lead screw to linear motion;

a linear guide rod for supporting one side said stage, said linear guide rod having its axis parallel to the direction of movement of said stage; and means for preventing rotation of said follower when said lead screw is rotated;

means for transferring linear motion of said follower to said stage, wherein said means transferring said linear motion comprises point contact surfaces provided therebetween.

15. A reader for reading a latent image on a stimulable phosphor member, said reader having at least one precision positioning stage assembly for moving a stimulable phosphor member, said precision positioning assembly comprising:

a movable stage;

a drive screw having a longitudinal axis which is parallel to the direction of movement of said stage;

a follower threadably engaged with said drive screw for converting rotational motion of said drive screw to linear motion;

a linear guide rail for supporting one side of said stage, said linear guide rail having its axis parallel to the direction of movement of said stage;

means for transferring linear motion of said follower to said stage;

means for preventing rotation of said follower when said lead screw is rotated;

means for compensating for misalignment between said drive screw and said linear guide rail upon which said stage is slideably mounted; and means for compensating for misalignment between said stage and said linear guide rail upon which it is slideably mounted.

* * * * *

UNITED STATES PATENT AND TRADEMARK OFFICE
CERTIFICATE OF CORRECTION

PATENT NO. : 5,329,825
DATED : July 19, 1994
INVENTOR(S) : Paul D. Askins

It is certified that error appears in the above-indentified patent and that said Letters Patent is hereby corrected as shown below:

Column 5, line 61, should read -- a drive screw having a longitudinal axis parallel to the --.
Column 5, line 63, should read --a follower threadably engaged with said drive screw --.
Column 5, line 64, should read --a linear guide rail for supporting one side of said--.
Column 5, line 65, should read --stage, said linear guide rail having its axis parallel--.
Column 6, line 6, should read --along said guide rail, said drive section and said--
Column 6, line 31, should read --a drive screw mounted on said base, said drive screw--.
Column 6, line 34, should read --a follower threadably engaged with said drive screw--.
Column 6, line 35, should read --a linear guide rail mounted to said base for supporting--.
Column 6, line 36, should read --one side of said stage, said linear guide rail having--.
Column 6, line 48, should read --driving said stage along said guide rail, said drive-
Column 6, line 49, should read --section and said contact surfaces having a config- --.

Signed and Sealed this

Third Day of January, 1995

Attest:

BRUCE LEHMAN

Attesting Officer

Commissioner of Patents and Trademarks